(12) United States Patent
Asano et al.

(10) Patent No.: US 7,195,400 B2
(45) Date of Patent: Mar. 27, 2007

(54) OPTICAL CONNECTOR AND ASSEMBLING METHOD FOR THE SAME

(75) Inventors: Mariko Asano, Sakura (JP); Koki Narita, Sakura (JP); Yoshihiro Ouchi, Sakura (JP); Yasuhiro Tamaki, Sakura (JP); Yoshikazu Nomura, Sakura (JP); Hideyuki Hosoya, Tokyo (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/132,098

(22) Filed: May 17, 2005

(65) Prior Publication Data

US 2005/0220424 A1 Oct. 6, 2005

Related U.S. Application Data

(63) Continuation of application No. 10/169,780, filed as application No. PCT/JP00/00034 on Jan. 7, 2000, now abandoned.

(30) Foreign Application Priority Data

Jan. 6, 2000 (JP) .............................. 2000-001125

(51) Int. Cl.
*G02B 6/28* (2006.01)
(52) U.S. Cl. ............................ 385/78; 385/77; 385/80; 385/85; 385/88
(58) Field of Classification Search ................ 385/78, 385/77, 80, 85, 88
See application file for complete search history.

(56) References Cited

U.S. PATENT DOCUMENTS 4,440,471 A 4/1984 Knowles

| 4,674,833 A | 6/1987 | Des Forges et al. |
| 5,216,733 A | 6/1993 | Nagase et al. |
| 5,862,280 A | 1/1999 | Tanaka et al. |

FOREIGN PATENT DOCUMENTS

| JP | 62-299918 A1 | 12/1987 |
| JP | 63-225207 A1 | 9/1988 |
| JP | 2-64508 A1 | 3/1990 |
| JP | 3-42606 A1 | 2/1991 |
| JP | 4-273202 A1 | 9/1992 |
| JP | 7-50216 A1 | 5/1995 |
| JP | 7-174937 A1 | 7/1995 |
| JP | 9-80263 A1 | 3/1997 |
| JP | 10-90558 A1 | 4/1998 |

*Primary Examiner*—Jinhee Lee
(74) *Attorney, Agent, or Firm*—Darby & Darby

(57) ABSTRACT

An optical connector ferrule has an optical fiber containing hole reaching from the rear end surface near the end surface and a fine pore extending from the optical fiber accommodating hole to the end surface to be connected. A bare fiber of a polarization-maintaining optical fiber is inserted into the fine pore. Since the length of the fine pore is short, the influence of the uniformness of the adhesive in the fine pore is smaller, and therefore the stress distribution is maintained, resulting in stabilizing the polarization characteristics. A flange unit is attached to the ferrule after an optical fiber is inserted to the ferrule and fixed. Therefore the optical fiber is easily adjusted with respect to the housing in the circumferential direction around the axis, and optical fibers are connected by but joining with high accuracy.

15 Claims, 10 Drawing Sheets

OPTICAL CONNECTOR AND ASSEMBLING METHOD FOR THE SAME

This application is a continuation of application Ser. No. 10/169,780 filed Nov. 14, 2002 now abandoned, which is a national phase of PCT/JP00/00034, filed Jan. 7, 2000, which claims priority of JP00/01125, filed Jan. 6, 2000. The PCT/JP00/00034 was published in Japanese as WO 01/50168 on Jul. 12, 2001.

BACKGROUND OF THE INVENTION

1. Field of the Invention

The present invention relates to an optical connector. The present invention particularly relates to an optical connector and assembling method for the same in which so called a Polarization Maintaining optical fiber is formed so as to be able to butt-connect and stress distribution of the cross section is different in two orthogonal directions.

FIG. 15 shows a conventional optical connector ferrule.

If FIG. 15, an optical connector ferrule 1 is made of ceramic, zirconium, and the like, and an optical connector ferrule 1 is a sleeve through which fine pores 2 are formed along a central axis line. Through the fine pores 2, an optical bare fiber 4 of which cover on the tip of optical fiber 3 (mainly an optical fiber core line) is removed is inserted from a rear end (center-right region in FIG. 15) of butt-connection direction of the optical connector ferrule 1. The rest of the cover 3a of the bare fiber 4 on the optical fiber 3 is fixed in a flange unit 5 having cylindrical shape which is fixed to a rear end of the optical connector ferrule 1 by bonding with bonding agent or the like.

Conventionally, so called a Polarization Maintaining optical fiber which can maintain and transport polarization phase of the transmitted light is provided as an optical fiber which can be used for various sensors and gyrotrons.

There are tow Polarization Maintaining optical fibers such as 1) an optical fiber of which stress distribution in a clad is asymmetric (stress birefringent), and 2) an optical fiber of which refractive index distribution is asymmetric by differentiating a component of the material for a clad partially (structural birefringence). In both Polarization Maintaining optical fibers, polarization can be transmitted stably by giving large birefringence to an optical fiber in advance. As Polarization Maintaining optical fiber such as above type 1), so called a PANDA type polarization Maintaining optical fiber (PANDA: Polarization-Maintaining and absorption-reducing) can be named typically. The PANDA type Polarization Maintaining optical fiber has a stress giving section made of quartz glass to which $B_2O_3$ is added for example, and the stress distribution is formed asymmetrically. In the PANDA type Polarization Maintaining optical fiber, even if an optical fiber is bent, unification of polarization mode hardly occurs, and the polarization of the light can be maintained and transmitted as such. When the above type 1) of Polarization Maintaining optical fiber was applied for an optical connector ferrule 1 so as to assemble an optical connector on the tip of this optical fiber, there used to be a concern that required optical property could not obtained because the stress distribution changed. If the above Polarization Maintaining optical fiber is inserted in fine pores 2 which is formed so as to penetrate along the entire length of the optical connector ferrule 1 such as a ferrule for the use of SC type optical connector (SC: Single Coupling optical fiber connector) defined in Japanese Industrial Standard (JIS) C5973, there was a case in which an optical fiber is bent unintentionally due to the difficulty of the inserting operation because the length of the bare optical fiber 4 (particularly a bare optical fiber) of which cover on the tip of the Polarization Maintaining optical fiber was removed is very long. There was also a disadvantage that stress strain occurs between the inner surface of optical connector ferrule 1 and the optical fiber (particularly bare optical fiber); thus, polarization property (extinction ratio) of the Polarization Maintaining optical fiber changes. Also, there is a possibility that the polarization property changes according to temperature due to a difference of coefficient of linear expansion between ferrule material and optical fiber to some extent.

For above reasons, there has been a requirement for developing an optical connector for a Polarization Maintaining optical fiber in which the required optical property can be obtained quite stably.

When Polarization Maintaining optical fibers are butt-connected each other by coupling optical connectors (including connection via an optical connector adapter), for example, in order to maintain and continue the polarization of the transmitted light between the both Polarization Maintaining optical fibers, it is necessary to butt-connect while synchronizing the stress distribution of the both Polarization Maintaining optical fiber accurately by positioning between the both stress giving sections of the Polarization Maintaining optical fibers. As far as an optical connector in which a housing is attached on the outside of the optical connector ferrule is concerned, it is common that the connecting is possible only in a required configuration according to engagement and fitting condition between the housing of the optical connector and the housing of the other optical connector (various female optical connector including optical connector adapter). When the configuration of the housings is fixed, the configuration of the optical connector ferrules which are supported in the housings is also fixed; thus, the configuration of the Polarization Maintaining optical fibers which are inserted and fixed in the optical connector ferrules is fixed. If it is necessary to maintain the polarization of the transmitted light between the both Polarization Maintaining optical fibers, the direction of the Polarization Maintaining optical fiber is positioned towards the housing by each optical connector so that the stress giving sections coincide between the both Polarization Maintaining optical fibers when optical connectors are connected.

Conventionally, it was common that an optical connector ferrule, a flange unit, and an optical connector which is provided with a housing are assembled by attaching the flange unit to the optical connector ferrule and inserting a bare fiber into the optical connector ferrule and further attaching the housing to the flange unit. A space between the housing and the flange unit is positioned by engagement of a key and a key slot. In such an assembling method, it is impossible to adjust the circumferential direction of the optical connector ferrule against the housing after the space between the housing and the flange unit is fixed. Therefore, it is impossible to change a circumferential direction of the Polarization Maintaining optical fiber after the Polarization Maintaining optical fiber is inserted and fixed in the optical fiber ferrule. That is, there used to be a complaints on the optical connector which was assembled by the above assembling method that it is impossible to change or adjust the circumferential direction of the Polarization Maintaining optical fiber which is inserted and fixed in the optical connector ferrule toward the housing because it is impossible to change the attaching direction of the flange unit which is fixed on the optical connector ferrule toward the housing, even if it is required to change the circumferential direction of the Polarization Maintaining optical fiber toward the housing according to the structure of the optical connector to fit with and the adjustment of connecting direction of the Polarization Maintaining optical fiber which is connected by the optical connector.

DISCLOSURE OF INVENTION

The present invention was made in consideration of above situation. The object of the present invention is to provide an optical connector for Polarization Maintaining optical fiber in which the required optical property can be obtained quite stably and an assembling method in which the circumferential direction of the Polarization Maintaining optical fiber toward the housing can be set desirably.

An optical connector of the present invention is characterized in that an optical connector ferrule through which an optical fiber having polarizing property is inserted has an optical fiber containing hole and a fine pore, the optical fiber containing hole and the fine pore are communicated each other, a tip of the optical connector ferrule are formed so as to be able to butt-connected, the optical fiber containing hole contains and fixes a coated region of the optical fiber and reaches near an end surface of the optical connector ferrule which is to be butt-connected reaching from a rear end of the optical connector ferrule, the fine pore is opened at the end surface of the optical connector ferrule, reaches to a tip of the optical fiber, and passes from the optical fiber containing hole through the end surface to be connected, and the fine pore is formed such that a stress distributions of the fine pore is differentiated in two orthogonal directions in cross section.

In an optical connector ferrule which is built in this optical connector, the length of the fine pore is limited in a short range such between the optical fiber containing hole to the connected end surface by the optical fiber containing hole which reaches near the connected end surface. By doing this, a Polarization Maintaining optical fiber which is inserted through the fine pore is hardly influenced by a factor such as uniformity of the bonding agent in the fine pore; thus, the stress distribution is maintained and the optical property is secure.

That is, in this optical connector ferrule, a Polarization Maintaining optical fiber is inserted in a short fine pore which reaches near the connected end surface and communicates from the optical fiber containing hole to the connected end surface; therefore, there are superior effects such as:

1) the Polarization Maintaining optical fiber which is inserted in the fine pore is hardly influenced by a factor such as uniformity of the bonding agent in the fine pore; thus, stress distribution is maintained and the polarization property is secured;
2) outer shape of the optical connector ferrule which is provided with the optical fiber containing hole and the fine pore can be similar to the conventional commonly-used optica connector ferrule; thus, there is no necessity to make changes to parts other than the optical connector ferrule of the optical connector, the efficiency of the connecting operation can be improved and the cost can be reduced.

The length of the fine pore should preferably be one third of the entire length between the connected end surface of the optical connector ferrule to a rear end of a flange unit which is attached at read end of the optical connector ferrule or less. As long as the length of the fine pore is within this range, positioning and fixing of the optical fiber which is contained in the optical fiber containing hole of the optical connector ferrule and maintaining the polarization property of the optical fiber are realized. As a result, the polarization property of the optical fiber can be maintained more stably. In addition, more specifically, the length of the fine pore should preferably be 2 to 3 mm. If the length of the fine pore is within this range, superior polarization property can be maintained, and positioning accuracy can be stably secured.

Also, in an optical connector according to Claim 5, a Polarization Maintaining optical fiber is inserted in a short fine pore which reaches near the connected end surface of the optical connector ferrule and communicates from the optical fiber containing hole to the connected end surface. Because of this, following effects can be obtained.

3) The Polarization Maintaining optical fiber which is inserted in the fine pore is hardly influenced by a factor such as uniformity of the bonding agent in the fine pore; thus, stress distribution can be maintained and the polarization property can be secured stably.
4) Outer shape of the optical connector ferrule which is provided with the optical fiber containing hole and the fine pore can be similar to the conventional commonly-used optica connector ferrule; thus, there is no necessity to make changes to parts other than the optical connector ferrule of the optical connector, the efficiency of the connecting operation can be improved and the cost can be reduced.
5) If the rear end of the optical connector ferrule is inserted and fixed in a ferrule containing hole of the flange unit, bonding agent existing on the rear end surface of the ferrule is stored in a concave region which is formed in a facing position toward the rear end surface of the ferrule at the butt-connecting point of the ferrule in the ferrule containing hole so as to prevent the bonding agent from contacting the flange unit. Therefore, attaching accuracy of the flange unit on the optical connector ferrule can be secured in high accuracy.
6) Because of the effect obtained in the above case of 5), it becomes unnecessary to wipe the bonding agent remaining on the rear end surface of the ferrule before the flange unit is attached; thus, efficiency of assembly operation improves, and a disadvantage such as damaging the optical fiber in such wiping operation can be prevented.

In an assembling method of the optical connector according to the present invention, a flange unit is attached to the ferrule after the optical fiber is inserted and fixed in the ferrule. Therefore, it becomes possible to set the direction of the housing toward the aligning direction of the stress giving section randomly during assembling the optical connector. By an assembling method according to the present invention, it becomes possible to set the position of the housing so that the position of the stress giving sections of the optical fibers which are connected via the optical connector adapter coincide for example, when the optical connector is attached to the optical connector adapter. As a result, an optical connector which can butt-connect optical fibers in high accuracy when the optical connectors are connected via the optical connector adapter. This advantage is equivalent to the case of the optical connector which is connected not via the optical connector adapter. That is, the space between the optical connector ferrules of each optical connector is determined by positioning the housings of the optical connectors, and at the same time, the Polarization Maintaining optical fibers which are inserted and fixed in the optical connector ferrules are positioned in predetermined direction (circumferetial direction of the axis). Thus, required optical property can be obtained between the Polarization Maintaining optical fibers which are butt-connected.

BEST MODE FOR CARRYING OUT THE INVENTION

First embodiment of an optical connector according to the present invention is explained as follows with reference to the drawings.

Figure 1:
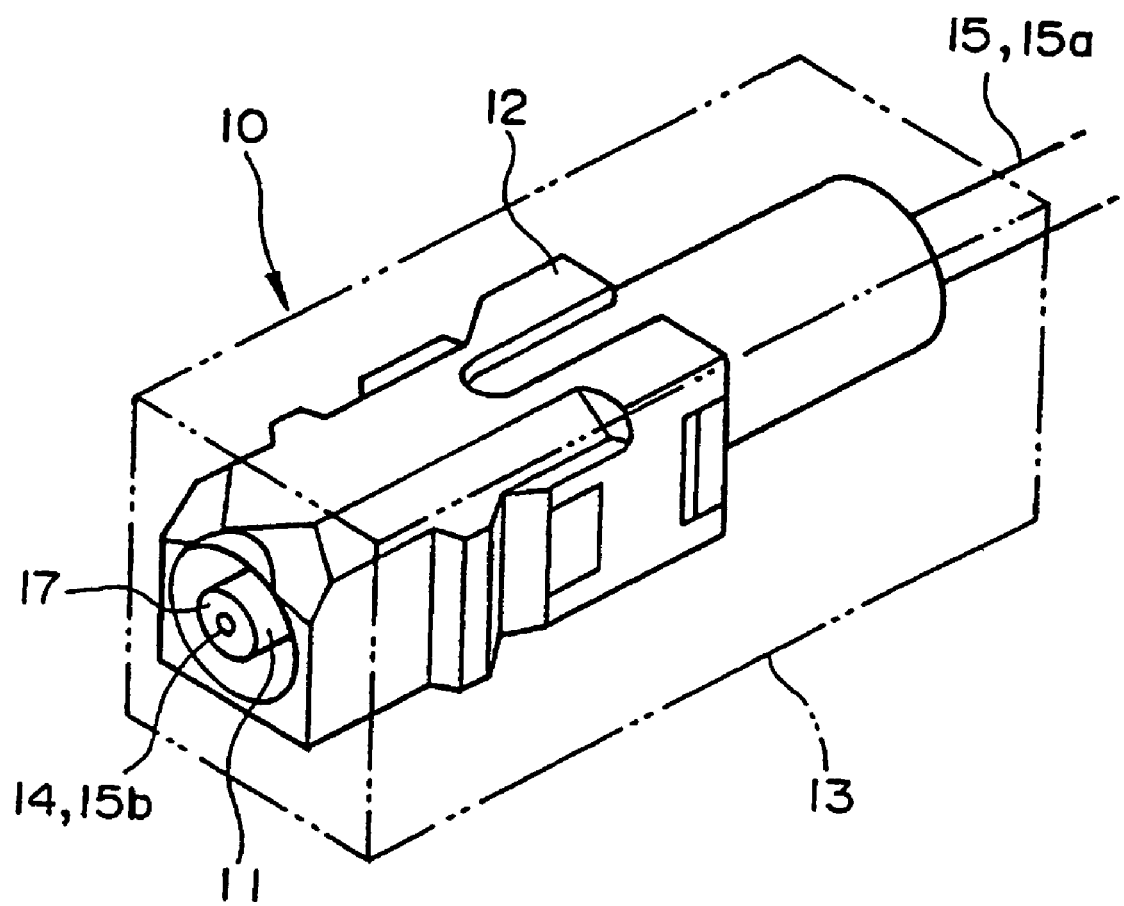
FIG. 1 is a perspective view showing a first embodiment of the optical connector of the present invention.

As shown in FIG. 1, this optical connector 10 is provided with an optical connector ferrule 11 (hereinafter called "ferrule"), a housing 12 which is assembled outside the ferrule 11, a knob 13, and a flange unit 18 which is fixed at rear end 11a of the ferrule 11. Ferrule 11 is a sleeve having a circular cross section having a fine pore 14 along a center line of the ferrule 11. Ferrule 11 is formed by zirconia ceramic, other ceramic, glass ceramics, and the like.

Figure 2:
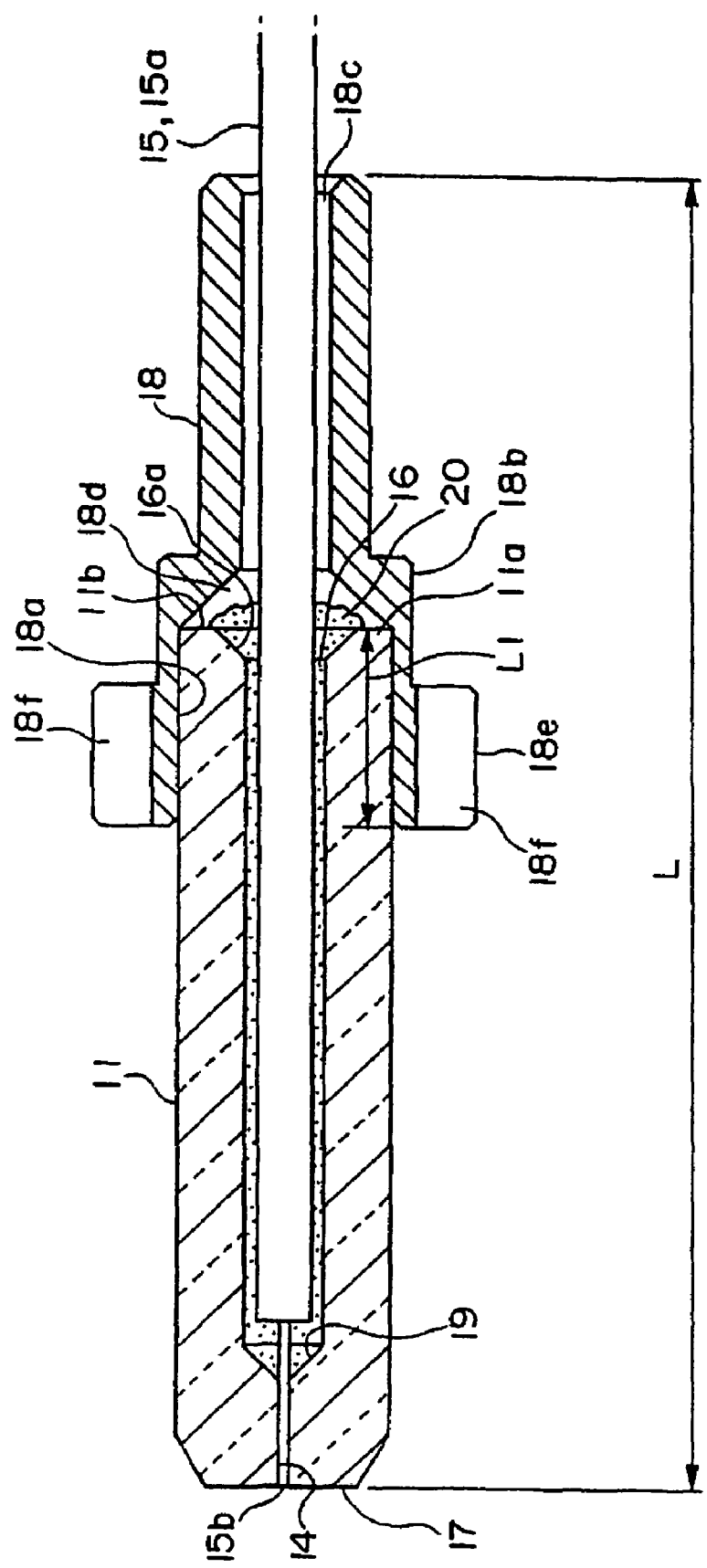
FIG. 2 is a cross section showing an optical connector ferrule of the optical connector shown in FIG. 1.

FIG. 2 is a cross section showing a ferrule 11.

In FIG. 2, an optical fiber containing hole 16 which contains and fixes optical fiber coated region 15a of the optical fiber 15 which is an optical fiber core line, and fine pore (14) of which tip coating is removed and exposed and has a bare optical fiber 15b are formed so as to communicate each other.

The optical fiber containing hole 16 reaches near a connected end surface 17 where ferrules 11 are butt-connected from rear end of the butt-connection (right hand side in FIG. 2). The fine pore 14 penetrates from the optical fiber containing hole 16 through the connected end surface 17. Diameters of the optical fiber containing hole 16 and the fine pore 14 are slightly (several μm) larger than the diameter 15a of the optical fiber 15 and the diameter 15b of the bare fiber. For example, the diameter of the optical fiber containing hole 16 is formed to be nearly 1 mm, and the diameter of the fine pore 14 is formed nearly between 125 to 130 μm. The length of the fine pore 14 is formed to be one third of the entire length of the ferrule 11 or less than that. More specifically, the entire length L between the connected end surface 17 of the ferrule 11 and the rear end of the flange unit 18 which is inserted and fixed in a rear end section 11a of the ferrule 11 is designed to be 16 mm. The length of the fine pore 14 is one third of the entire length L or less than the entire length L. In the fine pore 14 and the optical fiber containing hole 16, bonding agent such as epoxy which is not shown in the drawing is disposed. For such a bonding agent, for example, thermosetting epoxy resin adhesive can be used. For such a thermosetting epoxy resin adhesive, EPO-TEK 353-ND (Epoxy Technology Inc./U.S.A.) can be used.

The flange unit 18 performs positioning to fix the ferrule 11 in the housing 12 of the optical connector 10. The flange unit 18 is formed from metal such as stainless steel or plastics having sufficient rigidity in a sleeve shape. The flange unit 18 is provided with a ferrule containing hole 18a in which a rear end section 11a of the ferrule 11 is inserted, a ferrule butt-connection section 18b where the rear end 11a of the ferrule which is inserted and fixed in the ferrule containing hole 18a is butt-connected, and an optical fiber insertion hole 18c opening at the ferrule butt-connection section 18b and extending coaxially with the ferrule containing hole 18a, and the flange unit 18 is formed in sleeve shape. For a fixing method of the rear end section 11a of the ferrule which is inserted in the ferrule containing hole 18a to the flange unit 18, various methods such as fitting, bonding, and engaging can be employed.

Figure 3:
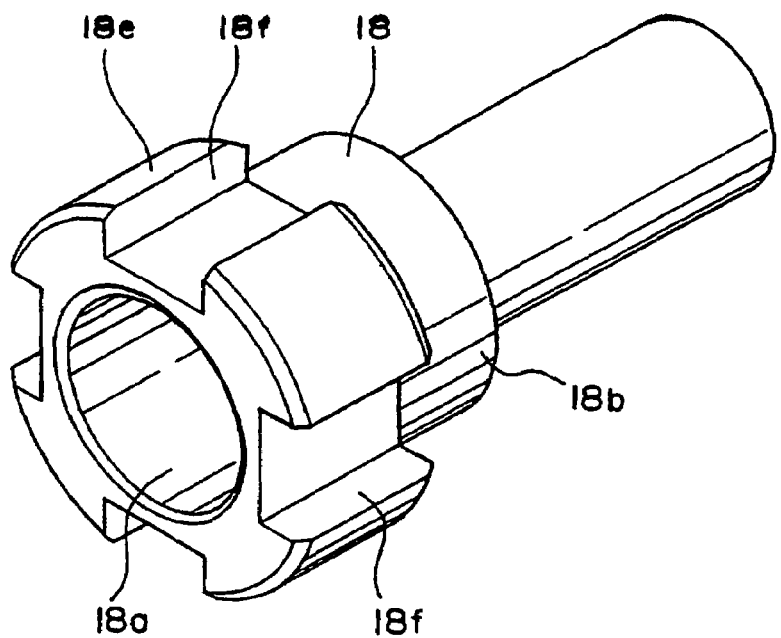
FIG. 3 is a perspective view showing a flange unit which is used for the optical connector shown in FIG. 1.

As shown in FIG. 3, a flange section 18e having ring shape is disposed so as to project toward the outside of the flange unit 18. On a plural points in circumferential direction of the flange section 18e, a groove 18f to which a groove and a protrusion inside the housing 12 are engaged is formed. In an assembling method which is to be mentioned later in this specification, the groove 18f functions as a positioning guide when attaching the housing. When the ferrule 11 in which the flange unit 18 is inserted is assembled to the housing 12, the position of the flange unit 18 is fixed by the groove and the protrusion inside the housing 12, and the position of the ferrule 11 is consequently fixed. Also, when protrusion inside the housing 12 engages to the groove of the flange section 18e, the rotation of the flange unit 18 around the center axis of the ferrule containing hole 18a is limited; thus, the rotation of the ferrule 11 (rotation around fine pore 14 as a center) which is inserted and fixed in the flange unit 18 is limited in circumferential direction around the center axis of the ferrule.

If an optical connector 10 is assembled by inserting and fixing the flange unit 18 in the ferrule 11 in which the optical fiber 15 is inserted and fixed, and by attaching the housing 12 on the outside of the ferrule 11 to which the flange unit 18 is already attached (while the flange unit 18 is inserted in the optical fiber 15 before the optical fiber 15 is inserted in the ferrule 11), the ferrule 11 is accurately positioned against the housing 12; thus, the optical fiber 15 is accurately positioned at a predetermined point on the optical connector 10. Also, the rotation of the ferrule 11 around the axis toward the housing 12 is limited; therefore, the rotation of the optical fiber 15 is limited. An optical fiber 15 is a stress birefringent Polarization Maintaining optical fiber, and in the optical fiber 15, the refractive indexes are different in two directions of which cross sectional directions are orthogonal due to the stress distribution. The refractive index distribution in cross sectional direction of the optical fiber 15 can be set in predetermined distribution against the housing 12 by limiting the rotation around the axis by the ferrule 11 in which the optical fiber 15 is inserted and fixed therein so as to be positioned on the housing 12.

As shown in FIG. 2, a concave section 18d of which concave shape is in taper is formed at the butt-connection section 18b of the ferrule 11. The concave section 18d is formed on the ferrule butt-connection section 18b so as to face the entire rear end surface 11b of the ferrule 11 which is inserted and fixed in the ferrule containing hole 18a. The shape of the concave section 18d is an enlarged shape of the end section of the optical fiber insertion hole 18c which is nearer the ferrule containing hole 18a.

When the tip of the optical fiber 15 of which bare fiber 15b is exposed in advance penetrates through the flange unit 18 and is inserted into the optical fiber containing hole 16 from a rear end of the ferrule 11, a bare fiber 15b is inserted into the fine pore 14 and optical fiber coated region 15a is inserted into the optical fiber containing hole 16. On an end of the optical fiber containing hole 16 which is nearer to the rear end surface 11b of the ferrule, a taper section 16a which is in an enlarged taper shape of the optical fiber containing hole 16 is formed; therefore, it is easy to insert the optical fiber 15 into the optical fiber containing hole 16. Between the optical fiber containing hole 16 and the fine pore 14, a taper section 19 is disposed; therefore, it is easy to insert the bare fiber 15b from the optical fiber containing hole 16 to the fine pore 14. Bonding agent is applied on the optical fiber containing hole 16 and the fine pore 14 before the insertion of the bare fiber 15b. The bonding agent can be filled in the fine pore 14, for example, by performing vacuum exhaust from the tip of the ferrule 11 (which is nearer to connection end surface). The connection end surface 17 of the ferrule 11 is ground in later process; therefore, required shape of the connection end surface 17 and the tip end surface of the bare fiber 15b can be obtained.

Figure 4:
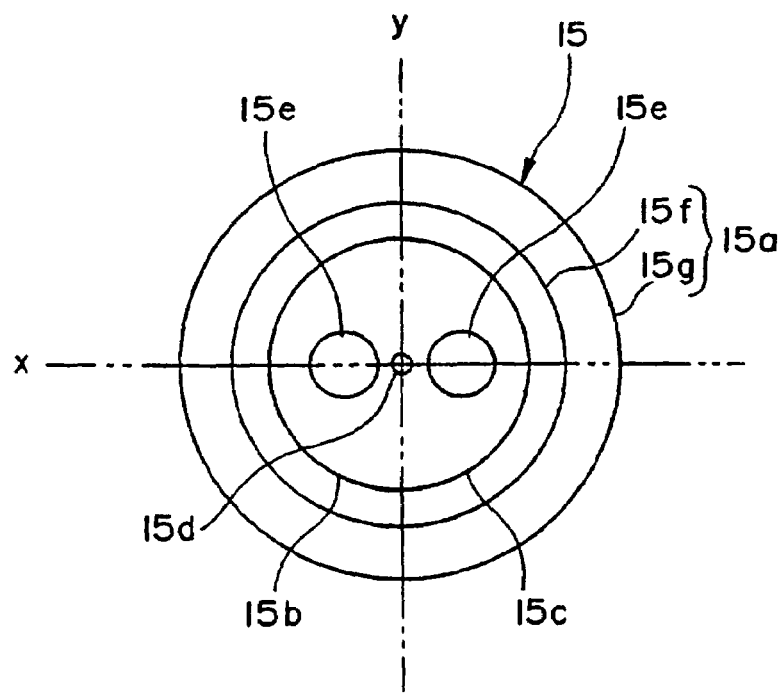
FIG. 4 is a cross section showing an optical fiber which is used for the optical connector shown in FIG. 1.

FIG. 4 is a cross section showing an example of the optical fiber 15.

In FIG. 4, for example, a core 15d having several μm to 10 μm of diameter is disposed in a center of the clad 15c having nearly 125 μm of the optical fiber 15. On the both sides of the core 15d, a pair of stress giving section 15e are disposed. On the outside of the clad 15c is coated by coated section 15a having double coating structure formed by a first coating section 15f and a second coating section 15g.

The stress giving section 15e is made of quartz glass to which $B_2O_3$ is added. The stress distribution of the bare fiber 15b is differentiated in two orthogonal direction of the cross sectional direction by the both stress giving sections 15e; thus, the refractive index is differentiated. The bare fiber 15b is so called a Polarization Maintaining optical fiber. That is, the stress which acts on the core 15d of the bare fiber 15b of the optical fiber 15 and the nearby light guiding section is larger in a direction of diameter (hereinafter called x direction) of the bare fiber 15b which passes the both stress giving sections 15e and 15e than in another direction of diameter which is orthogonal to the other diameter direction (hereinafter called y direction). The refractive index of the transmitted light which transmits through the transmission path which are made of the core 15d and its nearby section is larger in y polarization mode than in x polarization mode, and the combination of the orthogonal two polarization modes hardly occur; thus, the polarization property can be obtained stably.

According to the optical connector 10, as shown in FIG. 2, the bare fiber 15b is inserted in the short fine pore 14 (for example, 2 to 3 mm) which is formed in narrow area between the connected end surface 17 of the ferrule 11 and the optical fiber containing hole 16 which reaches near the connected end surface 17. Therefore, factors such as uniformity of the bonding agent in the fine pore 14 is not a problem; thus, the root cause which influences to the stress distribution of the bare fiber 15b in the fine pore 14 such as bad uniformity in the stress distribution of the bonding agent during hardening and the difference of the temperature property between the bare fiber 15 and the bonding agent can be solved. Therefore the optical property such as polarization property of the optical fiber 15 as a Polarization Maintaining optical fiber can be maintained stably.

According to the optical connector 10, a barometer of polarization property of the Polarization Maintaining optical fiber such as crosstalk can be improved. Crosstalk can be detected as an extinction rate of x polarization mode or y polarization mode between an light incidence end and an light emission end of the Polarization Maintaining optical fiber having sufficient length. By employing the optical fiber 10, the required polarization property is maintained stably in the optical fiber 15 (optical fiber 15 in the fine pore 14) which is near the connection section with other optical fiber and optical components; thus, the crosstalk can be maintained in low level securely.

Because of this, when this optical connector 10 is applied to optical fiber sensors such as an optical fiber gyroscopes, high sensing property can be obtained securely thanks to a low crosstalk.

Figure 7:
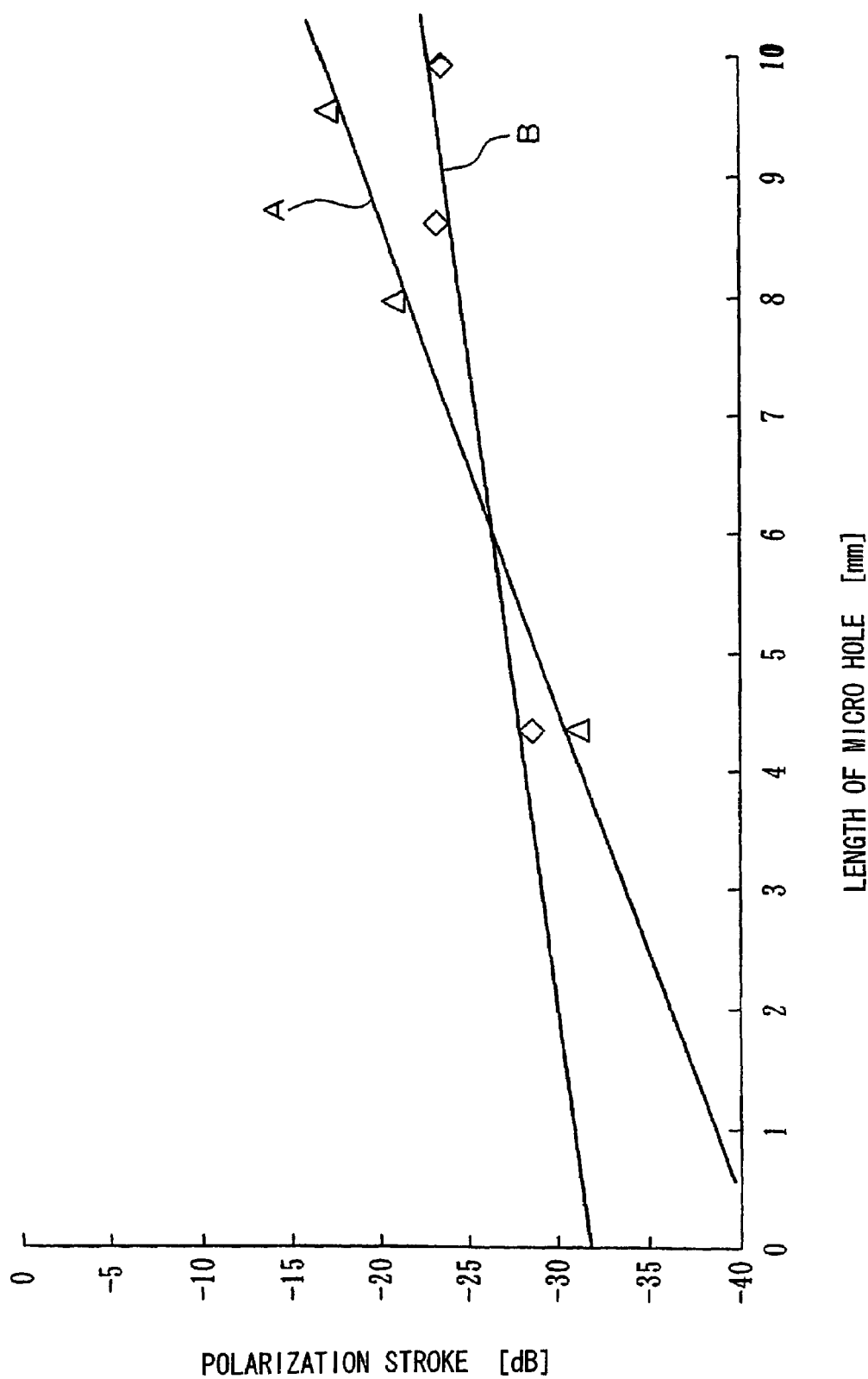
FIG. 7 is a graph showing a relationship between the length (mm) of the fine pore of the optical connector ferrule and cross-talk (db) and showing a polarization property of the optical connector according to the present invention.

In addition, the inventors prepared optical connector ferrules having various shape while designing housings in which optical connector ferrules are contained, and measured polarization property of the Polarization Maintaining optical fiber (stress birefringent type Polarization Maintaining optical fiber) which is inserted into the optical connector ferrule and fixed the bonding agent. As a result, the inventors found that a short Polarization Maintaining optical fiber has better polarization property (extinction rate does not decreases) than the case of the long Polarization Maintaining optical fiber. Consequently, the inventors prepared various length of optical connector ferrules in which fore pore penetrates therethrough and reseached a relationship between the length of the hine pore and the polarization property. (polarization crosstalk db)). The measurement result is shown in FIG. 7. In FIG. 7, two samples A and B (hereinafter called optical connector ferrules A and B) having same condition are prepared, Polarization Maintaining optical fibers (stress birefringent type Polarization Maintaining optical fiber such as bare fiber) having 125 μm of outer diameter is inserted and fixed in fine pores having 126 μm of inner diameter (tolerance within ±1 μm), and the connected end surfaces of each optical connector ferrule A and B are machined and ground. By such a method, results of measurement of crosstalk (polarization crosstalk in FIG. 7) which is obtained by shortening the fine pore gradually are shown in FIG. 7. A Polarization Maintaining optical fiber which is inserted into a fine pore are bonded and fixed therein by above mentioned thermosetting epoxy resin adhesive such as EPO-TEK 353-ND (Epoxy Technology Inc./U.S.A.). As shown in FIG. 7, a relationship that the polarization property of Polarization Maintaining optical fiber decreases when the fine pore is longer in both case of optical connector ferrule A, B is found. That is, from FIG. 7, it is understood that the polarization property of a Polarization Maintaining optical fiber improves better when a fine pore is shorter. As a result of consideration, it is found that the deterioration of the polarization property according to the length of the fine pore is caused by bad influences to the polarization property due to a difference in coefficient of the linear expansion between a Polarization Maintaining optical fiber in a fine pore and a ferrule, and distortion and stress which act on a Polarization Maintaining optical fiber due to the hardening of the bonding agent. Therefore, it is found that the reason why the polarization property becomes superior when the fine pore becomes shorter is that when a fine pore becomes shorter, the bonding length of the Polarization Maintaining optical fiber which is inserted in the fine pore and the ferrule becomes shorter, accordingly bad influences such as a difference of a coefficient of a linear expansion between the Polarization Maintaining optical fiber in the fine pore and the ferrule, and distortion and stress of the Polarization Maintaining optical fiber due to the hardening of the bonding agent is alleviated.

However, from a viewpoint of bonding strength between the Polarization Maintaining optical fiber and the ferrule, even though the purpose is to obtain a superior polarization property, there is a limit in shortening the length of the fine pore. Also, as far as an optical connector ferrule which is contained in a housing is concerned, the entire length of the optical connector is limited often; therefore, further consideration is necessary to find a better structure of the optical connector ferrule by which a superior polarization property can be obtained. As a result in pursuit of such structure, the inventor of the present invention concluded that it is fine to form a fine pore only in a limited region of the tip of the optical connector ferrule, and the present invention is completed accordingly. By an optical connector ferrule of the present invention, superior polarization property can be obtained even if the entire length of the optical connector ferrule is limited.

According to a research of the inventors of the present invention, it is found that the change of the polarization property in nearby front and rear region of the end of the connector of the optical fiber 15 including a bare fiber 15b can be reduced, and there is few influence of small difference of the temperature property between the ferrule 14 and the bare fiber 15b.

In addition, in this optical connector 10, a ferrule rear end section 11a is inserted and fixed in a ferrule containing hole 18a in a flange unit 18 after an optical fiber 15 is inserted into an optical fiber insertion hole 16 and a fine pore 14, and the hardening of the bonding agent 20 in the optical fiber insertion hole 16 and the fine pore 14 is completed. The shape of the concave section 18d is denting from the ferrule containing hole 18a toward a ferrule butt-connection section 18b in a taper shape. On the other hand, an outer surface of the ferrule 11 is cylindrical shape precisely contacting an inner surface of the ferrule containing hole 18a having a circular cross section (as shown in FIG. 3). The ferrule 11 is inserted in the ferrule containing hole 18a to the point where the diameter of the ferrule containing hole 18a decreases by a concave section 18d. The ferrule 11 is positioned at depth L1 by butt-connecting to the ferrule butt-connecting section 18b near an opening section of the ferrule containing hole 18a of the concave section 18d. Even if the ferrule rear end section 11a which is inserted into the ferrule containing hole 18 of the flange unit 18 is butt-connected to the ferrule butt-connected section 18b, a concave section 18d exists near the ferrule rear end surface 11b (end surface of rear end surface 11a). Even if a bonding agent 20 which hardens remaining on the ferrule rear end surface 11b and a bonding agent which hardens protruding from the optical fiber insertion hole 16 exist on the ferrule rear end surface 11b, there is no such a case that the bonding agent 20 existing on these ferrule rear end surface 11b is contained in a concave section 18d of the flange unit 18 and contacts the ferrule butt-connection section 18b of the flange unit 18. Therefore, if the ferrule rear end section 11a is inserted and fixed in the ferrule containing hole 18a of the flange unit 18, the flange unit 18 can be attached to the ferrule 11 in high accuracy. If the depth of the concave section 18d (dimension between the concave section 18d and the border of the ferrule containing hole 18a) is 0.5 mm or larger, it is sufficient to contain the bonding agent 20 which hardens remaining protruding from the optical fiber containing hole 16.

In addition, the size of the concave section 18d is fine as long as the bonding agent 20 existing protruding on the ferrule rear end surface 11b can be contained. The size and the shape of the concave section 18d can be changed preferably. For example, it is fine that the concave section 18d formed only near the optical fiber containing hole 18c which is opening on the ferrule butt-connection section 18b.

Also, for parts and units other than the optical connector ferrule 11 of the optical connector 10 and the flange unit 18, parts and units for SC type optical connector (Single fiber Coupling optical fiber connector) which are defined in JIS (Japanese Industrial Standard) can be used. That is, because the optical connector ferrule 11 is provided with an optical fiber containing hole 16 and a fine pore 14, an optical connector ferrule 11 having the same length and the outer shape with the optical connector ferrule for the SC type optical connector which is defined in JIS C5973 can be used by adjusting the length of the optical fiber containing hole 16 even if it is necessary to shorten the length of the bare fiber 15b which is inserted into the fine pore 14. Regarding the flange unit 18, it becomes usable for the hosing and a plug frame for the SC type optical connector which is defined in JIS C5973 by adjusting the dimension preferably. The parts and units which are for a SC type optical connector which is deficed in JIS C5973 can be used for other parts and units for the optical connector 10 such as a housing 12 or the like.

Therefore, the optical connector 10 can be handled as if the optical connector 10 is the same as the SC type optical connector which is defined in JIS C5973. Thus, the optical connector 10 is superior in connecting operation and cost performance.

In addition, an optical connector according to the present invention is not limited to the above mentioned SC type optical connector, but an optical connector according to the present invention can be applied to various optical connectors which have optical connector ferrule similarly. For example, an optical connector according to the present invention can be applied to so called an FC type optical connector (Fiber transmission system optical Connector) which is defined in JIS C5970 and an MU type optical connector (Muniature-Unit coupling optical fiber connector) which is defined in JIS C 5983, and an ST type optical connector (ST type optical connector is a trademark of AT & T company).

An outer diameter of the optical connector ferrule can be changed according to the type of the optical connector. For example, diameter of the optical connector ferrule which is applied to the MU type optical connector is formed to be 1.25 mm or near to that.

Figure 5:
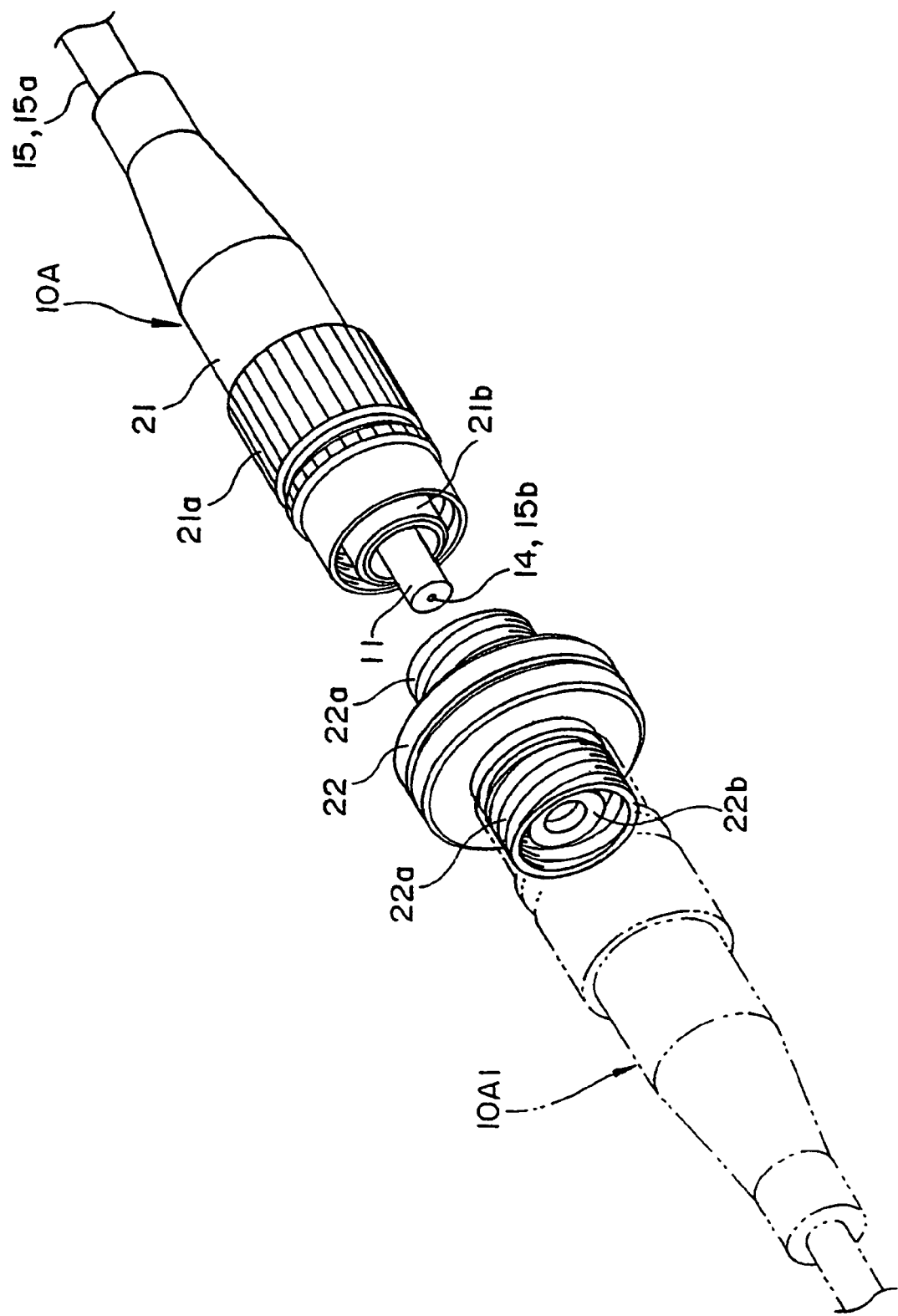
FIG. 5 is a perspective view showing an example in which the optical connector shown in FIG. 1 is applied to an FC type optical connector.

FIG. 5 is an example of the optical connector ferrule to an FC type optical connector. However, optical connector 10A and 10A1 in FIG. 5 should not necessarily be the optical connector defined in JIS C5970. If FIG. 5, a ferrule 11 is disposed on a tip of the optical connector 10A, and a flange unit 18 (not shown in the drawing) which is inserted and fixed on a rear end section of the ferrule 11 so as not freely rotate therein is contained in a housing 21 of the optical connector 10A. The connection between the optical connector 10A and a female optical connector 22 of the optical connector 10A is maintained by screwing a nut 21a which is disposed on the housing 21 so as to freely rotate there onto a screwing sleeve 22a. The engaging method is a screw engagement method in which the engagement can be released by screwing in counter direction. The ferrule 11 on a tip of the optical connector 10A is precisely positioned to the ferrule 11 of other optical connector 10A1 (having the same structure with the optical connector 10A) which is connected to the opposite side by putting the ferrule 11 through a screwing sleeves 22a on both sides of the female optical connector 22 (optical connector adapter) so as to be inserted in a cylindrical positioning sleeve 22b which is contained and fixed in the female optical connector 22. Thus, the ferrule is butt-connected in the positioning sleeve 22b. A cylindrical sleeve 21b which is disposed on outside of the ferrule 11 is disposed and fixed on an outside of the positioning sleeve 22b of the female optical connector 22; thus, the cylindrical sleeve 21b helps maintaining the positioning accuracy of the ferrule 11 which is inserted in the positioning sleeve 22b.

In the optical connectors 10A and 10A1, because the ferrule 11 and the flange 18 are positioned and fixed precisely, the position of the ferrule 11 in the female optical connector 22 can be obtained in high accuracy, and the optical fibers 15 which are inserted and fixed to each ferrule can be connected in very precise positioning accuracy. Additionally, if a housing 21, a sleeve 21b, and a flange unit 18 are disposed so as not freely rotate in a screwing sleeve 22a of the female optical connector 22 and a positioning sleeve 22b and positioned a rotating direction therearound by engaging key to an key groove, each ferrule 11 can not only be positioned in a position where each ferrule 11 can be butt-connected, but also positioned in rotating direction therearound. Thus, the optical fibers 15 which are inserted and fixed in each ferrule 11 can be butt-connected each other accurately by coinciding the refractive index or by offsetting to a predetermined degrees.

Figure 6:
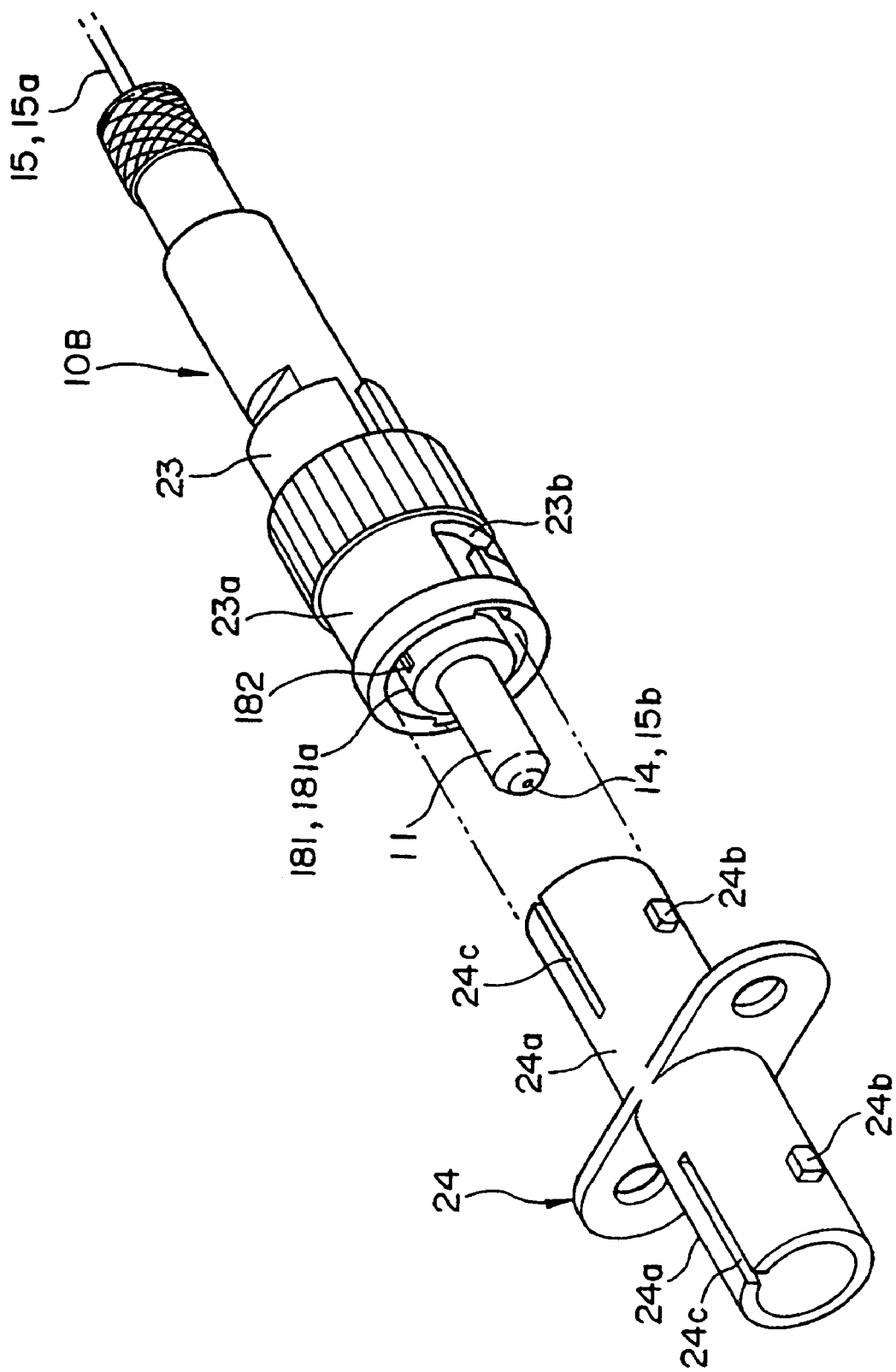
FIG. 6 is a perspective view showing an example in which the optical connector shown in FIG. 1 is applied to a ST type optical connector.

FIG. 6 is an example in which the present invention is applied to an ST type optical connector.

In FIG. 6, an optical connector 10B is connected to a female optical connector 24 (optical connector adapter) with a Bayonet method. That is, if a ferrule 11 on a tip of the optical connector 10B is inserted in a positioning sleeve 24a of a female optical connector 24, a sleeve 23a which is disposed on a tip of a housing 23 so as to rotate freely which contains a flange unit 181 which is inserted and fixed on a rear end section of the above mentioned ferrule 11 is engaged onto an outside of the positioning sleeve 24a of a female optical connector 24, a groove 23b which is formed on a sleeve 23a is hooked and coupled with a protruding section 24b of a positioning sleeve 24a of a female optical connector 24; thus, the optical connector 10B is connected with the female optical connector 24. Also, if an engagement of the groove 23b to the above mentioned protruding section 24b is released, the engagement of the optical connector 10B to the female optical connector 24 can be released. In addition, structure of a flange unit 181 is the same as structure of a flange unit 18 as shown in FIGS. 2 and 3 except that a key 182 is disposed so as to protrude on a flange unit 181a.

A female optical connector 24 is provided with positioning sleeves 24a on both sides of a female optical connector 24. For example, if optical connectors 10B are connected to both sides of the female optical connector 24, the ferrule 11 of each optica connector 10B is inserted and positioned accurately and butt-connected in a positioning sleeve 24a; thus optical connectors 10B are connected. In this optical connector 10B, a ferrule 11 and a flange unit 181 are positioned accurately and fixed, the positioning accuracy of the ferrule 11 in the female optical connector 22 can be maintained very accurately; thus, the optical fibers 15 which are inserted and fixed in the ferrules 11 can be connected with very high positioning accuracy.

In addition, in an optical connector 10B which is shown in FIG. 6, a key 182 which is disposed to protrude on a flange section 181a of the flange unit 181 is inserted into a key groove 24c which is formed in a slit on a positioning sleeve 24a of a female side optical connector 24; thus, rotation of an optical connector 10B around the positioning sleeve 24a is restricted. Therefore, a ferrule 11 which is inserted into a positioning sleeve 24 is not only positioned as a position where butt-connection of the ferrules 11 which are inserted into the female optical connector 24 from the both sides is possible, but also positioned in rotational direction around the positioning sleeve 24a; therefore, the optical fibers 15 which are inserted and fixed in ferrules 11 can be butt-connected accurately by synchronizing the refractive index distribution or offsetting by predetermined angle.

Additionally, in FIGS. 5 and 6, althought, structure in which optical connectors having same structure are connected via optical connector adapter is shown, structure of the present invention is not limited to such a structure. For example, even if optical connectors having different engaging structure or fitting structure for optical connector adapter are connected each other, as long as an optical connector is provided with a ferrule and a flange unit according to the present invention, when Polarization Maintaining optical fibers are connected, superior connecting accuracy can be obtained, and the effect that the connection can be performed with very accurately positioned refractive index distribution of each optical fiber is obtained. For example, even in a case in which a receptacle and an optical connector (optical connector plug) are connected, as long as the receptacle and the optical connector are provided with a ferrule and a flange unit according to the present invention, abovementioned effect can be obtained.

(Assembling Method)

Next, an embodiment of assembling method of an optical connector according to the present invention is explained with reference to drawings as follows. Here, particularly a structure in which direction of a Polarization Maintaining optical fiber which is inserted and fixed in an optical connector ferrule around the axis of the housing can be set freely is explained.

Figure 8:
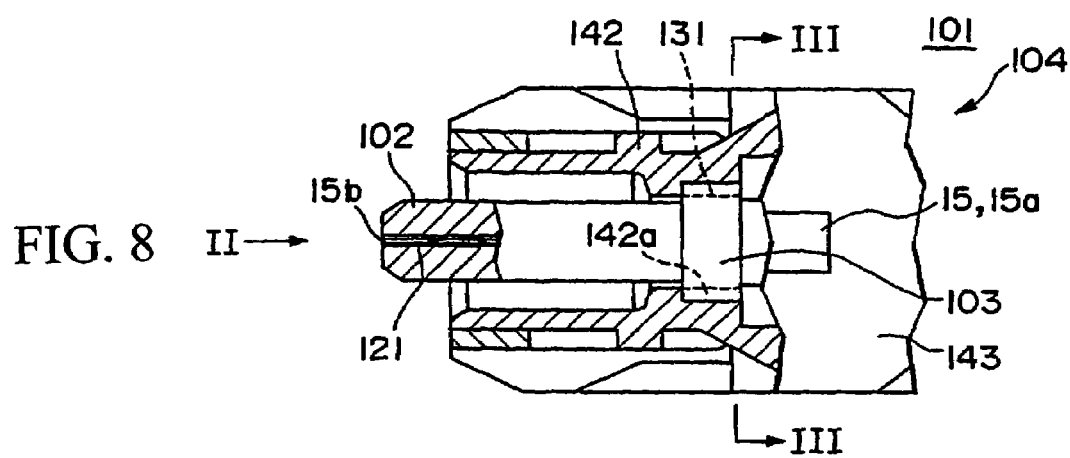
FIG. 8 is a cross section of a part of an optical connector which is viewed in an arrow direction "I" shown in FIG. 9, and shows an example of structure of SC type optical connector.
Figure 9:
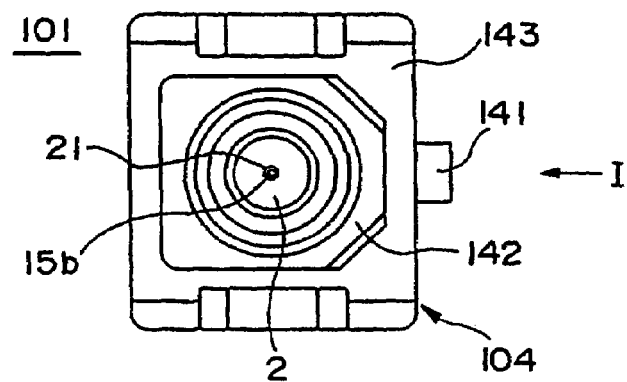
FIG. 9 shows an end surface of an optical connector which is viewed in direction "II" shown in FIG. 8, and shows an example of structure of SC type optical connector.
Figure 10:
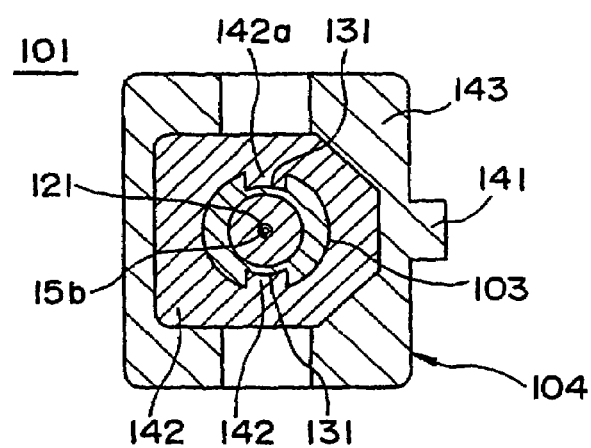
FIG. 10 is a cross section of an optical connector which is viewed along a line "III—III" shown in FIG. 8, and shows an example of structure of SC type optical connector.

In FIGS. 8 to 10, an example of a structure of a Polarization Maintaining optical connector 101 (hereinafter called "optical connector") is shown. Here, FIG. 8 is a cross section showing a part of an optical connector 101 viewed from an arrow I shown in FIG. 9. FIG. 9 is a front view showing an optical connector 101 viewed from an arrow II as shown in FIG. 8. FIG. 10 is a cross section showing an optical connector 101 taken along a line III—III as shown in FIG. 8.

This optical connector 101 is equivalent to an SC type optical connector (Single fiber coupling optical fiberconnector) which is defined in JIS C5973. This optical connector 101 is provided with an optical connector ferrule 102 (hereinafter called "ferrule"), a flange unit 103 which is fixed in a rear end of the ferrule 102 (right-hand side in FIG. 8) and a housing 104 which supports the flange unit 103.

A ferrule 102 is a sleeve having a circular cross section and is made from ceramic, zirconia, or quartz glass. On and extended line of the axis of the ferrule, a fine pore 121 is formed so as to penetrate through a ferrule 102. In a fine pore 121, a bare fiber 15b which is exposed from a tip of the optical fiber 15 is inserted and fixed therein from a rear end, and an end surface of a tip of the bare fiber 15b which is inserted in a fine pore 121 is positioned so as to be aligned with an end surface of the tip of the ferrule 102. The diameter of the fine pore 121 is several μm larger than the diameter of the bare fiber 15b (10 to 20 μm). Between an inner surface of the fine pore 121 and a surface of the bare fiber 15b, a bonding agent is replenished (not shown in a drawing). The detail of the optical fiber 15 is explained with reference to FIG. 4.

A flange unit 103 supports a ferrule 102 at a predetermined position in a hosing 104. A flange unit 103 is made from metal or resin having sufficient rigidity. Also, on an outer surface of the flange unit 103, key sections (positioning section) are fromed in two or four points along a circumferential direction. In a drawing, a vertical pair of key section 131 are formed having same interval along the abovementioned circumferential direction.

A housing 104 is made of resin so as to cover a periphery of the ferrule 102 and the flange unit 103. A housing 104 is provided with a plug frame 142 which directly contains a ferrule 102 and a flange unit 103, a knob 143 which covers a periphery of the plug frame 142. A plug frame 142 is in a hollow column, and on its inner surface, a vertical pair of convex sections 142a for engaging with the abovementioned key sections 131 are formed. The ferrule 102 and the flange unit 103 are supported at a predetermined position in the plug frame 142 from the key section 131 ad the reference point by engagement of the key section 131 and the convex section 142a.

A knob 143 is in a hollow column as an entire shape, and a plug frame 142 is supported at a predetermined position in a know 143 by engaging a plug frame 142 from it tip in a predetermined direction. Also, a key 141 is formed so as to protrude toward the outside along the longitudinal direction on a side surface of the knob 143. That is, the position of the key 141 is determined by a position of a groove section 131 which is formed on a flange unit 103 in an SC type optical connector.

In a case of a Polarization Maintaining optical connector, it is necessary to synchronize the positions of stress giving sections 15e of the optical fiber 15 between the optical connectors 101 which are connected via the optical connector adapter (not shown in the drawing) so as to obtain a required optical property. When a connector 101 is attached to an adapter such that the key 141 which is formed on a side surface of the housing 104 should engage with a key groove which is formed on an optical connector adapter, the position of the key 141 or the key groove are set such that the positions of the stress giving sections 15e of the optical fibers 15 of which end is aligned by optical connectors 101 which are connected by adapters should coincide each other.

In an assembling method of the optical connector 101 according to the present invention, at first, a flange unit 103 is attached around the optical fiber 15, after that, the bare fiber 15b which is exposed from a tip of the optical fiber 15 is inserted and fixed in a fine pore 121 from a rear end of the ferrule 102 (opposite side which faces the tip side which is ground to be explained later). Next, the tip surface of the ferrule 102 is ground.

After the grinding operation of the ferrule 102 is completed, the direction of the stress giving sections 15e in the bare fiber 15b is examined, after that, the flange unit 103 which is attached around the optical fiber previously is attached to the ferrule 102 such that the groove section 131 should be in predetermined position taking an alignment of the stress giving section 15e into account. Here, the position of the groove section 131 is determined taking the direction of the housing 104 toward an alignment of the stress giving section 15e into account when the housing is attached referring to the position of the groove section 131 as a reference point.

After the flange unit 103 is fixed to the ferrule 102, the groove section 131 and the convex section 142a are engaged, and a ferrule 102 and a flange unit 103 are supported by a plug frame 142. Consequently, by engaging a knob 143 to a plug frame 142, an optical connector 101 can be obtained such that a direction of a housing 104 should be disposed at a predetermined position while a ferrule 102 and a flange unit 103 should be covered by a housing 104 and a key 141 should be positioned according to alignment of the stress giving section 15e.

That is, according to the present invention, by attaching a flange unit 103 to a ferrule 102 after fixing a bare fiber 15b to the ferrule 102, it becomes possible to set randomly a position of a groove section 131 according to an alignment of the stress giving section 15e and furthermore a direction of a housing 104 and a key 141. Accordingly, by the present invention, when a key 141 is engaged with a groove section which is formed on an adapter and an optical connector 101 is connected via an adapter, it becomes possible to set a position of the key 141 such that the positions of the stress giving sections 15e which are connected via adapters coincide. As a result, when an optical connector 101 is connected via an adapter, an optical connector 101 in which bare fibers 15b can be butt-connected in high accuracy can be obtained.

In addition, in an optical connector 101 according to the present invention, a position of a key 141 is determined by a position of a knob 143, a position of a knob 143 is determined by a position of a plug frame 142, a position of a plug frame 142 is determined by a position of a groove section 131, and furthermore, a position of a groove section 131 is determined by a position of a stress giving section 15e. Therefore, according to the present invention, regarding attaching the flange unit 103 to the ferrule 102, only by properly positioning the groove section 131 according to the position of the stress giving section 15e, the positioning accuracy between the housing 104 and the bare fiber 15b is secured, and an optical connector 101 in which the bare fibers 15b can be butt-connected in high accuracy can be obtained.

Additionally, although the shape and property of ferrule of the optical connector shown in FIGS. 8 to 10 is different from the case of the optical connector 10 as shown in FIGS. 1 to 6, it is needless to say that the assembling method for the optical connector 101 can be applied to the case of the optical connector 10 as shown in FIGS. 1 to 6. For example, in a case in which only bare fibers which are exposed at the tip of the optical fiber cord and the optical fiber core are contained and fixed in the ferrule, it is necessary to be careful so as not to damage the optical fiber by contacting the optical fiber in connecting and fixing operation of the flange unit to the ferrule. However, in an optical connector 10, as shown in FIG. 2, a coated section 15a of the optical fiber 15 is bonded and fixed in an optical fiber containing hole 16, thus, when this assembling method is employed, there are effects such that the optical fiber 15 is hardly damaged even by contacting the optical fiber 15 during the fixing operation of the flange unit 18 to the ferrule 11, and there is hardly an influence to optical property of the bare fiber 15b which is inserted and fixed in the fine pore 14 of the ferrule 11.

Figure 11:
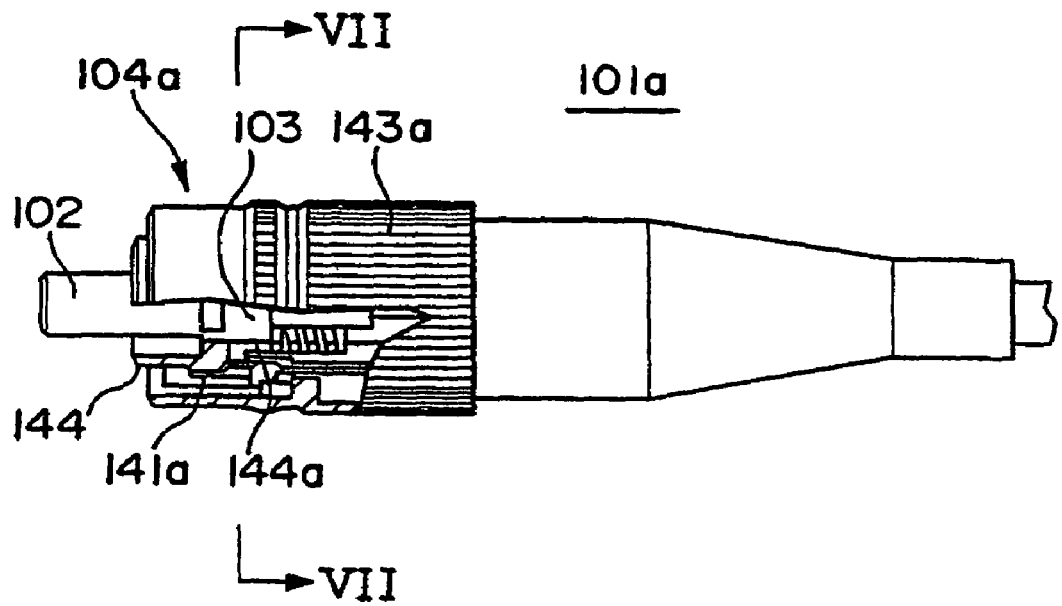
FIG. 11 is a cross section of a part of an optical connector which is viewed in an arrow direction "VI" shown in FIG. 12, and shows an example of structure of FC type optical connector.
Figure 12:
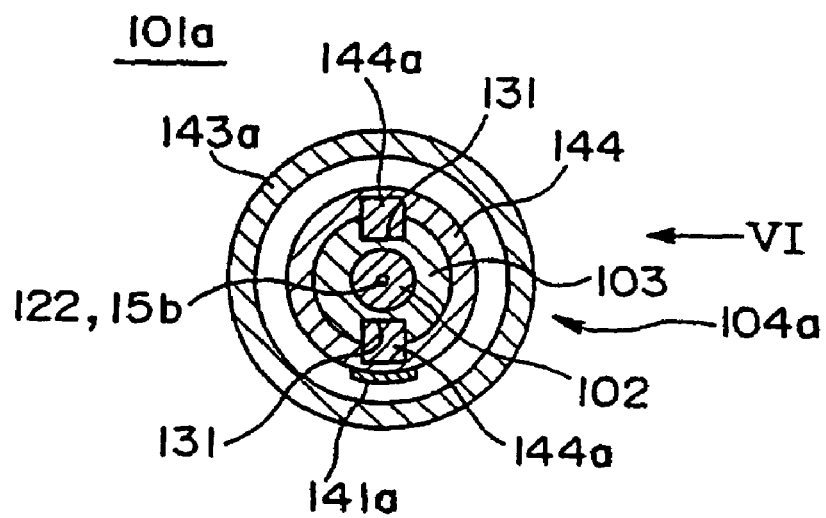
FIG. 12 is a cross section of an optical connector which is viewed along a line "VII—VII" shown in FIG. 11, and shows an example of structure of FC type optical connector.
Figure 13:
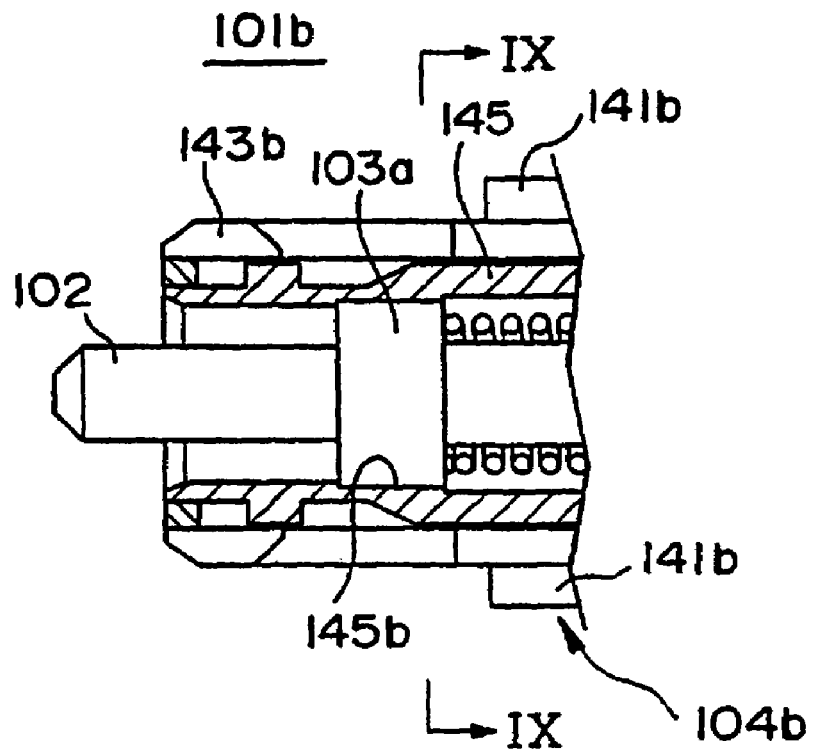
FIG. 13 is a cross section of a part of an optical connector which is viewed in an arrow direction "VIII" shown in FIG. 14, and shows an example of structure of MU type optical connector.

Also an assembling method for an optical connector 101 according to the present invention can be applied not only to the abovementioned SC type optical connector, but also to various Polarizing Maintaining optical connectors having a ferrule, a flange unit, and a housing. This assembling method can also be applied to so-called an FC type optical connector (Fiber transmission system optical fiber connector to be referred to FIGS. 11 and 12) having a cylindrical housing 104a which is defined in JIS C 5970, so called an MU type optical connector (Miniature-Unit coupling optical fiber connector to be referred to FIGS. 13 and 14) having housing 104b having a pentagonal cross section which is defined in JIS C 5983, and an ST type optical connector and the like. Here, in each optical connector shown as an example as follows, a housing 104a and 104b are formed by a plug frame and a knob and the like.

In a case of an FC type optical connector 101a, similarly with the case of the abovementioned SC type optical connector, by an engagement of a groove section 131 near the flange unit 103 and a convex section 144a which is disposed to protrude from a plug frame 144, the ferrule 102 and the flange unit 103 are supported so as to be concentric with the plug frame 144 at a predetermined position in the plug frame 144 from a convex section 144a and a groove section 133 as the reference point, also by fitting a plug frame 144 into a knob 143a, the plug frame 144 is supported at a predetermined position in the knob 143a. In a case of an FC type optical connector, a key 141a is disposed in a space between the plug frame 144 and the knob 143a.

Figure 14:
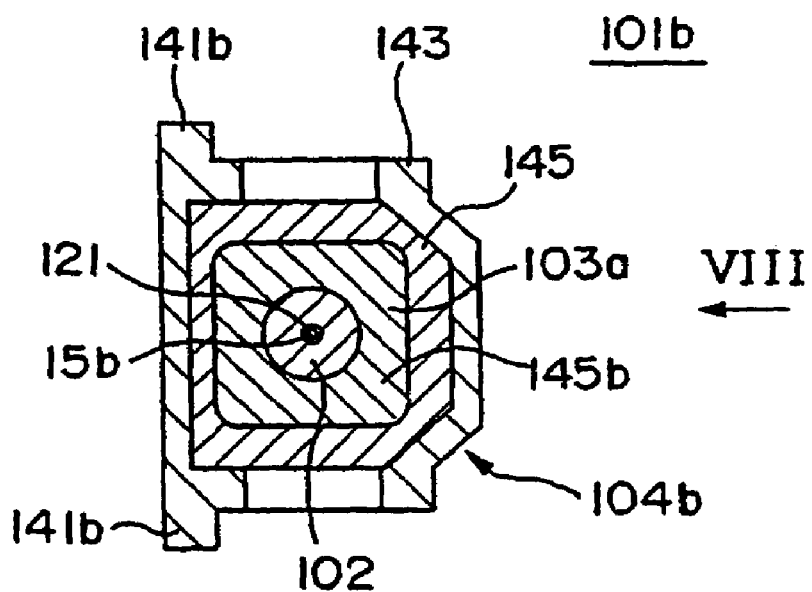
FIG. 14 is a cross section of an optical connector which is viewed along a line "IX—IX" shown in FIG. 13, and shows an example of structure of MU type optical connector.
Figure 15:
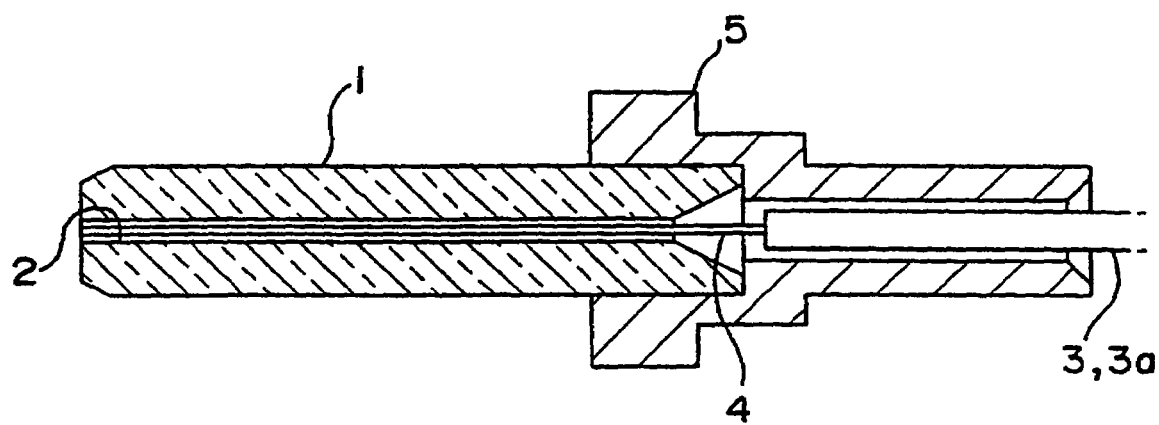
FIG. 15 is a cross section showing an conventional optical connector.

On the other hand, in a case of an MU type optical connector 101b, as shown in FIG. 14, because a flange unit 103a is in a rectangular shape viewed from one end of the flange unit 103a, by engaging g this flange unit 103a into a concave section 145b which is formed on the plug frame 145, the ferrule 102 and the flange unit 103a are supported so as to be concentric with the plug frame 145 at a predetermined position in the plug frame 145, and by engaging the plug frame 145 in a knob 143b from the tip side, the plug frame 145 is supported at a predetermined position in the knob 143b. The key 141b is disposed so as to protrude toward the outside from the both side surfaces of the knob 143b facing each other.

Therefore, also in an FC type optical connector and an MU type optical connector, by attaching the flange unit to the ferrule after fixing the bare fiber 15b to the ferrule 102, an optical connector in which the bare fibers 15b can be butt-connected in high accuracy in a direction in which the space between the stress giving sections have a desirable relative position can be obtained; thus, it becomes possible to obtain desirable optical property between the optical connectors which are connected securely and easily.

What is claimed is:

1. An optical connector comprising:
an optical connector ferrule having:
a first end having a surface to be butt-connected to a corresponding first end surface of another optical connector ferrule;
an optical fiber containing passage having an entrance hole at the other end of the optical connector ferrule to accept and contain the covered end of an optical fiber, the optical fiber-containing passage extending through the optical connector ferrule in communication with one end of a fine pore in the optical connector ferrule of a lesser diameter than the fiber-containing passage, the other end of the fine pore extending to the surface of the first end of the optical connector ferrule, the fine pore accepting an uncovered part of the optical fiber, the optical fiber having stress distribution differentiated in two orthogonal directions on a cross section of the optical fiber;
wherein the length of the fine pore is not longer than one third of the entire length from the first end surface of the optical connector ferrule to the other end of the optical connector ferrule; and
wherein the optical fiber-containing passage and fine pore form a positioning device on the ferrule to align the optical fiber inserted into the optical connector ferrule.

2. An optical connector according to claim 1, wherein length of a fine pore is 2 to 3 mm.

3. An optical connector according to claim 1, wherein the diameter of the fine pore is nearly the same as an outer diameter of an uncoated optical fiber which is inserted into the fine pore, or larger by several micrometers.

4. An optical connector according to claim 1 further comprising:
a flange unit is fixed to the other end of the optical connector ferrule;
a housing in which the optical connector ferrule is contained with the flange fixed to the housing;
the flange unit having a ferrule-containing hole in which the other end of the optical connector ferrule is inserted, a ferrule butt-connection section to which the other end section of the optical connector ferrule is inserted and fixed in the ferrule-containing hole, and an optical fiber insertion hole which is opened in the ferrule-butt-connection section;
a concave section formed in a region facing against a rear end surface of the optical connector ferrule which is inserted and fixed in the ferrule-containing hole of the ferrule-butt-connection section.

5. An optical connector according to claim 1, wherein the ferrule is a sleeve having a round cross section.

6. An optical connector according to claim 1, wherein the diameter of the fine pore is in a range of 125 to 130 µm.

7. An optical connector according to claim 4, wherein the housing, a sleeve and the flange unit are positioned by engagement between a key and a key groove.

8. An assembling method for an optical connector which is provided with:
an optical connector ferrule in which an optical fiber having polarizing property is inserted, the optical connector having an optical fiber containing hole and a communicating fine pore;
a tip of the optical connector ferrule formed to be able to butt-connect against another optical connector ferrule;
the optical fiber containing hole to contain and fix a coated region of the optical fiber and the fine pore extends to an end surface of the optical connector ferrule which is to be butt-connected, so as to reach from a rear end of the optical connector ferrule to the tip, comprising the steps of:

forming the fine pore such that a stress distribution of the fine pore is differentiated in two orthogonal directions in cross section of the optical fiber to provide positioning of the optical fiber regarding alignment of the stress giving section after the optical fiber is inserted into the connector ferrule;

wherein the length of the fine pore is not longer than one third of entire length from the tip to be butt-connected to a rear end of a flange unit which is attached to a rear end of the optical connector ferrule, and fixing an optical fiber inserted in the optical fiber containing hole by a bonding agent.

9. The method of claim 8 wherein the length of a fine pore is 2 to 3 mm.

10. An assembling method for an optical connector according to claim 8, wherein a groove formed in the flange serves as a positioning device.

11. An assembling method for an optical connector according to claim 8, wherein a groove formed in the flange is engaged with a protrusion formed in the housing.

12. A method for assembling an ST-connector using the method of claim 8.

13. A method for assembling an FC-connector using the method of claim 8.

14. An ST-connector assembled by the method of claim 8.

15. An FC-connector assembled by the method of claim 8.

* * * * *